P. H. WORKMAN.
SIGNALING MEANS.
APPLICATION FILED DEC. 13, 1916.
1,269,035.
Patented June 11, 1918.
2 SHEETS—SHEET 2.
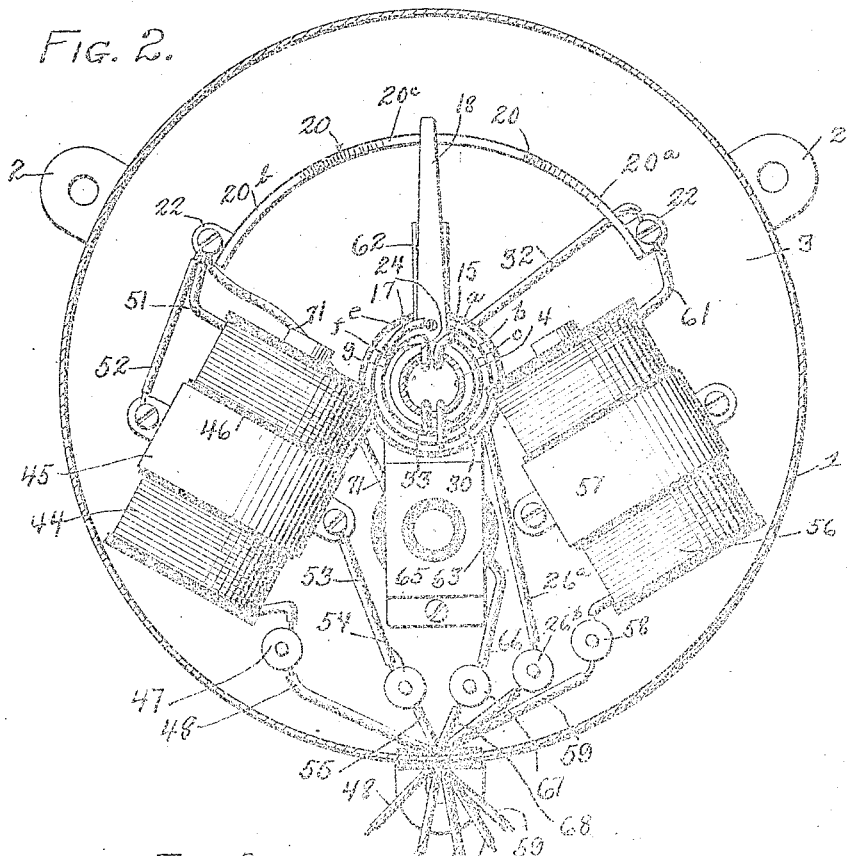
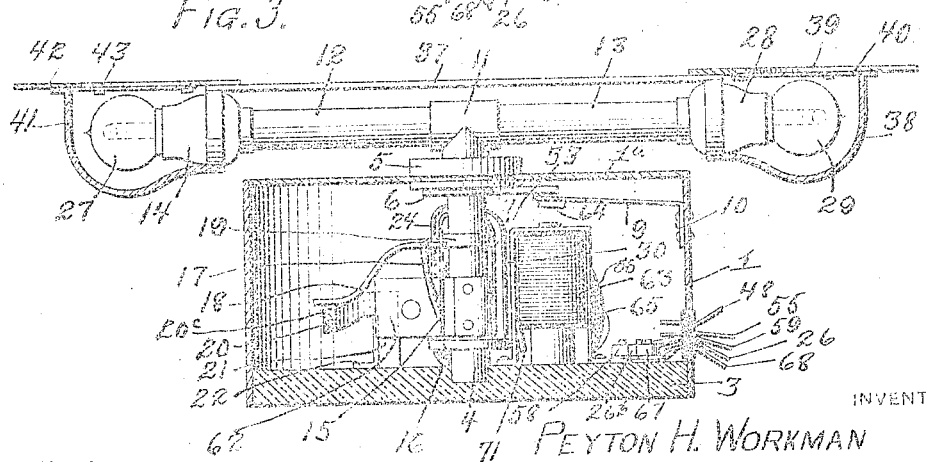
INVENTOR
PEYTON H. WORKMAN
WITNESSES
ATTORNEY

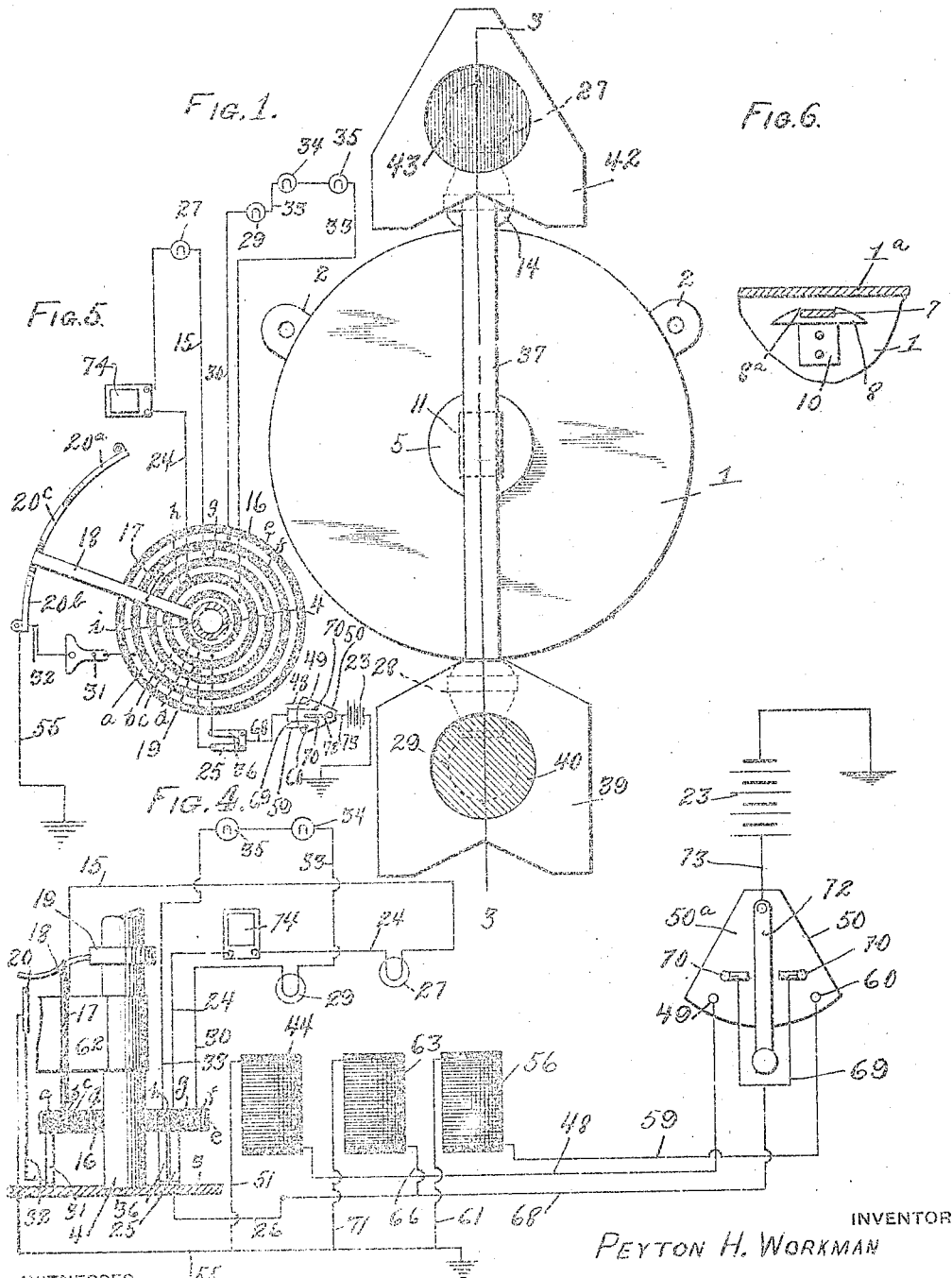

UNITED STATES PATENT OFFICE.

PEYTON H. WORKMAN, OF SANTA ANA, CALIFORNIA, ASSIGNOR OF ONE-THIRD TO CORNELIOUS M. STEELE AND ONE-THIRD TO HIPOLITO SEPULVEDA, BOTH OF SANTA ANA, CALIFORNIA.

SIGNALING MEANS.

1,269,035.  Specification of Letters Patent.  Patented June 11, 1918.

Application filed December 13, 1916. Serial No. 136,741.

*To all whom it may concern:*

Be it known that I, PEYTON H. WORKMAN, a citizen of the United States, residing at Santa Ana, in the county of Orange and State of California, have invented certain new and useful Improvements in Signaling Means, of which the following is a specification.

This invention relates to signaling means, and more particularly to electro-magnetically operated signaling means adapted to be attached to the rear of an automobile body or similar vehicle for the purpose of indicating when the vehicle is about to make a turn, and the direction of the contemplated turn, or when the vehicle is about to stop.

One of the main objects of the invention is to provide signaling means of the character stated of comparatively simple construction and operation which will be moved in the direction of the contemplated turn, or may be oscillated in the manner of a wig-wag signal to indicate that the vehicle is about to be stopped. A further object is to provide signaling means which may be quickly and easily connected to the battery or generator of an automobile so as to be energized therefrom. Another object is to provide means for normally locking the signal in inoperative position, in combination with means for illuminating an indicating light and for simultaneously moving the locking means into inoperative position. Further objects will appear from the detailed description.

In the drawings:

Figure 1 is a front view of a signaling apparatus constructed in accordance with my invention.

Fig. 2 is a vertical sectional view taken near the outer end of the inclosing casing.

Fig. 3 is a section taken substantially on line 3—3 of Fig. 1.

Fig. 4 is a diagrammatic view showing the connections for the electro-magnets and the light circuits.

Fig. 5 is a diagrammatic view of the light circuits and the connections for the same.

Fig. 6 is a detail view of the means for locking the signal-arm supporting shaft against rotation.

The numeral 1 designates a cylindrical sheet metal casing provided with radially extending tabs 2 for attachment to the body of an automobile or similar vehicle. A disk 3 of fiber, or other suitable material which is an electrical insulator, is secured in the inner end of casing 1. This disk is provided with a central recess which rotatably receives the inner end of a tubular supporting shaft 4 the outer end portion of which is rotatably mounted through a brass bearing-sleeve 5 secured through the outer end $1^a$ of casing 1 in alinement and concentric with the recess in disk 3. A collar 6 is secured on shaft 4, adjacent bearing sleeve 5, and is provided with an integral radially extending arm 7. This arm is adapted to fit into a recess $8^a$ of a securing head 8 formed integral with a leaf spring 9, the outer end of which is turned down and secured to the side wall of casing 1, as at 10. The head acts to normally lock shaft 4 against rotation thus securing the signal in inoperative position. As will be noted from Fig. 6 of the drawings the head 8 is inclined upwardly from each end toward the recess $8^a$ so as to permit the arm 7 to pass readily above the same for engagement into the recess.

A T 11 is secured on the outer end of shaft 4. A signaling arm, composed of the tubular rods 12 and 13 threaded into the arms of the head of T 11, is secured in this T. A light socket 14 is secured on the outer end of rod 12. The negative side of this socket is connected by a wire 15 to the second copper contact ring $b$ of a multiple contact disk 16 secured on shaft 4 a short distance above the base disk 3. The contact disk 16 is formed of a plurality of alternately arranged concentric rings $a$, $b$, $c$, and $d$, and $e$, $f$, $g$, $h$, and $i$, of copper and rubber, or other suitable electrical insulating material. The wire 15 is, of course, provided with a suitable insulating covering and is mounted inside of the rod 12 and shaft 4, a suitable opening being provided through the shaft so as to permit connecting of the wire to contact ring $b$. The innermost ring $i$ of insulating material serves to effectually insulate the contact disk from the shaft 4. The second contact ring $b$ of disk 16 is also connected by a lead 17 to a resilient downwardly directed and arched contact tongue 18 carried by a collar 19 secured on shaft 4. The outer end of this tongue extends over an arcuate contact bar 20 of copper provided, at each end, with an integral arm 21 and ear 22 for attachment to disk 3. This bar is of undulating configuration, having the upwardly arching end portions $20^a$ and $20^b$, and the intermediate downwardly arched portion or recess $20^c$. When shaft 4 is in normal position, tongue 18 extends above recess $20^c$ of contact bar 20, the tongue being so disposed as to normally be out of contact with the bar.

The positive side of socket 14 is connected by a wire 24 to copper rings $c$ of contact disk 16. A spring contact 25 engages ring $c$ and is connected by a wire 26 to a suitable switch for connecting the contact to the positive side of the electric battery 23, or other suitable source of supply of electrical energy. The contact bar 20 is grounded, in a manner to be hereinafter described, to the vehicle frame. By this means when the shaft 4 is oscillated in either direction about its axis of rotation, the indicating light 27 mounted in socket 14 will be illuminated, the negative side of battery 23 being grounded also as shown in Fig. 5 of the drawings.

A socket 28 similar to socket 14 is mounted on the outer end of tubular rod 13, and a light 29 is mounted in this socket. The negative side of socket 28 is connected by a wire 30 to contact ring $a$ of disk 16, which is engaged by a spring contact 31 connected by lead 32 to contact bar 20, so as to ground the negative side of the socket. The positive side of socket 28 is connected by wire 33 in series with the lights 34 and 35. Wire 33 is connected to the innermost copper contact ring $d$ of disk 16, which is engaged by a spring contact 36 connected to contact 25 by a common base so as to be connected to the positive side of battery 23 through wire 26. By this arrangement, when the circuit of battery 23 is closed, the light 29 and lights 34 and 35 will be illuminated in a manner to be later described.

A sheet metal strip 37 is mounted above and parallel with the signaling arm. To one end of this strip is secured a casing or hood 38 which incloses the light 29. A plate 39 shaped to represent the feathered portion or base of an arrow is secured over the front of hood 38 and is provided with an opening in front of which is mounted a green lens 40. A similar hood 41 is secured to the other end of the strip about indicating light 27 and is provided with a plate 42 shaped to represent an arrow point. Plate 42 is provided with an opening in front of which is mounted a red lens 43. Normally, only the light 29 will be illuminated, so as to display the green or "caution" signal. When it is desired to make a turn or to stop, the indicating light 27 will be illuminated to display the red or "danger" signal. This illumination of the indicating light is accomplished by oscillating shaft 4 in either direction about its axis of rotation so as to bring tongue 18 into contact with one of the upwardly arched end portions of the contact bar 20 thus connecting the negative side of socket 14 to the negative side of battery 23 and completing the circuit through the light.

An electro-magnet 44 is secured to base 3 by means of a band 45 passed about the same and provided with securing tabs, a suitable insulating ring 46 being interposed between this band and the coil of the magnet. One end of the coil of this magnet is connected to a binding post 47 which is connected by wire 48 to the contact 49 of a multiple point switch 50. The other end of the coil of magnet 44 is connected by lead 51 to the contact bar 20. One end of bar 20 is connected by lead 52 to band 45 which is connected by lead 53 to a binding post 54 which is grounded by a wire 55 to the vehicle frame. An electro-magnet 56 is secured to base 3, by means of a band 57, the two magnets being positioned to each side of, and equi-distant from the shaft 4. One end of the coil of magnet 56 is connected to a binding post 58 which is connected by wire 59 to contact 60 of switch 50. The other end of the coil of this magnet is connected by a lead 61 to the contact bar 20. By this means, the two magnets 44 and 56, and the lights 27, and 29, 34, and 35, are all grounded through the contact bar 20 by means of lead 52, band 45, lead 53, and wire 55.

An armature 62 of laminated construction is secured on shaft 4 above the contact disk 16. This armature extends radially from the shaft and is normally positioned midway between the poles of the magnets 44 and 56. By energizing one or the other of these magnets the armature 62 will be attracted toward the energized magnet so as to oscillate shaft 4 in that direction and move the tongue 18 into contact with the contact bar 20. By operating the switch 50 so as to energize either magnet, optionally, the shaft may be oscillated in the direction desired. To permit this oscillation of the shaft it is necessary to provide means for releasing the shaft from the head 8 slightly in advance of the energizing of the magnet.

A vertically disposed electro-magnet 63 is mounted between the magnets 44 and 56 with its pole directly beneath, and closely adjacent, an armature 64 secured on the inner face of spring 9 adjacent the inner end thereof. This magnet is secured in proper position by a U bracket 65 placed about the same and secured to base disk 3. One end of the coil of the electro-magnet 63 is connected by a lead 66 to a binding post 67 to which is connected a wire 68, the other end of which is connected to a wire 69 the opposite ends of which are connected to two spaced contacts 70 secured on the base 50ª of switch 50. The other end of the coil of magnet 63 is connected by a lead 71 to the contact bar 20. The switch 50 is provided with a rotatable handle 72 which is connected by a lead 73 to the positive side of battery 23. The contact strips 70, and contacts 49 and 60, are positioned equi-distant from the transverse center of switch base 50ª and contacts 49 and 60 are in radial alinement with the outer end portions of strips 70 relative to the pivotal point, or axis of rotation, of the switch handle. By this means, when the switch handle is moved toward the left, as considered from Fig. 4 of the drawings, it will first engage contact 70 so as to close the circuit from the positive side of the battery through wire 68 and lead 66 to the electro-magnet 63. The current will flow through coil of magnet 63, lead 71, contact bar 20, lead 52, band 45, lead 53, and wire 55 to ground and thence to the negative side of the battery. This will result in energizing the magnet 63 so as to cause it to attract its armature 64 thus releasing arm 7 from the locking head 8 so as to permit oscillation of shaft 4 about its axis of rotation. The current will divide, and a portion of this current will flow from wire 68 through the wire 26, spring contact 36, wire 33, lights 34 and 35, light 29, wire 30 to contact ring a, spring contact 31, lead 32, bar 20, to ground and back to the negative side of the battery. As the movement of handle 72 of the switch toward the left is continued, the handle will engage contact 49. A current will flow from the positive side of battery 23 through wire 48, the coil of magnet 44, lead 51, and then to ground and the negative side of the battery so as to energize magnet 44. When this magnet is energized it will attract the armature 62 so as to swing the shaft 4 toward the left, as considered from Fig. 2 of the drawings, thus bringing tongue 18 into engagement with the raised end portion 20ᵇ of contact bar 20 so as to close the circuit of the indicating light 27. As will be clear from Fig. 4 of the drawings, the arrow or signal arm is swung in the same direction as handle 72 of switch 50 so that in order to give the proper signal, it is only necessary to swing the switch handle in the direction in which it is desired to turn. But very slight movement of the shaft 4 is necessary to bring tongue 18 into contact with bar 20 so that the tongue will be in sliding engagement with the bar during the greater part of its lateral movement. By this means, after the indicating light is illuminated, it continues to move in the direction in which the turn is to be made thus serving as a clear visual signal to persons in back of the vehicle indicating clearly in which direction the turn is to be made. If it is desired to turn to the right, the switch handle 72 will be swung toward the right as considered in Fig. 4 of the drawing so as to first engage the right hand contact 70 so as to release the shaft for rotation. As the movement of the handle is continued it will engage contact 60 so that a current will flow through wire 59, the coil of magnet 56, lead 61, and contact bar 20 to ground and thence to the negative side of the battery 23. When the switch handle is moved into this position the magnet 56 will be energized so as to swing the signal arm toward the right and illuminate the indicating light in the manner previously described. When it is desired to stop, the handle 72 of switch 50 is first moved from one side then to the other so as to close the circuits of electro-magnets 44 and 56, alternately, thus imparting oscillatory movement to the indicating light in opposite directions the light acting as a wig-wag signal to warn persons in back of the vehicle that the driver is about to stop the same.

As previously stated, when switch handle 72 is moved into engagement with either one of the contact strips 70, the circuit of the lights 34 and 35, and light 29, is closed so as to illuminate the same. These lights may be considered as auxiliary head and tail lights which serve as means for giving a visual signal preliminary to the operation of the main signaling means. By continuing movement of the switch handle into engagement with either of the contacts 49 or 60, the main signal will be operated in the manner previously described. When the lights 34 and 35, and light 29, are illuminated electromagnet 63 will be energized so as to release shaft 4 for rotation. During the period elapsing between the movement of the switch handle into engagement with one of the contact strips 70, and the movement of this handle into full operative position, this resilient contact 18 will serve in combination with the undulating contact bar 20 as means for preventing excessive swinging of the arrow in either direction. When the switch handle has been moved into its extreme position so as to engage either of the contacts 49 or 60, this finger will engage the bar so as to provide a braking device for preventing excessive jarring or jolting of the signaling arm due to its being suddenly moved laterally when one of the electro-magnets for operating the same is energized. The outer end portion of finger 18, when the arm is swung in either direction, engages the upwardly curved end portion of bar 20, the tension of the spring increasing uniformly with the movement of the arm so as to gradually stop movement of this member as it is swung into its extreme position in either direction.

A buzzer 74 is interposed in the wire 24 which connects the positive side of the socket of the indicating light 27 to the positive side of the battery 23. This buzzer serves as an audible signal to indicate to the driver of the vehicle whether or not the magnet 44 is being energized so as to operate the signal arm. On the other hand, the head lights 34 and 35 which are connected in shunt with the circuit of magnet 63 serve as a visual signal or indicator to show whether or not current is flowing to this magnet.

By my invention I provide a signaling means having an indicating arm provided at one end with an indicating light and at the other end with a tail light, in combination with simple and efficient means for oscillating the arm in either direction about its axis of rotation and for simultaneously illuminating the indicating light. This signaling means is normally mounted on the back of a vehicle with the arrow disposed in vertical position, in which position it is normally held locked by the head 8 and arm 7, as previously described. This lock is moved into inoperative position previous to the oscillation of the signaling arm or arrow, this movement of the lock being controlled by the same means for controlling the movement of the arm.

It will be evident that there may be slight changes made in the construction and arrangement of the different parts of my invention without departing from the field and scope of the same, and I intend to include all such changes, as fall within the scope of the appended claims, in this application in which a preferred form only of my invention is disclosed.

What I claim is:

1. In signaling means, a rotatable shaft, a signaling arm secured thereon and provided with a light at each end, means for normally locking the shaft against rotation, a source of supply of electrical energy, electro-magnets positioned at each side of said shaft equi-distant therefrom, an armature secured to said shaft and extending radially from the same midway between the poles of said magnets, means for connecting one of said lights to said source of supply of electrical energy and for simultaneously releasing said shaft, means for connecting the other light to the said source of supply of electrical energy when the shaft is oscillated, said means also serving as a braking device to retard rotation of the shaft, and means for connecting either of said electromagnets to said source of supply of electrical energy, optionally.

2. In signaling means, a casing, a shaft rotatable therein, a signaling arm carried by said shaft at the outer end thereof, means for releasably locking said shaft against rotation, an electric light carried by said arm at one end thereof, means for rocking the shaft in either direction, and circuit closing means interposed in the circuit of said light for closing said circuit when the shaft is rocked in either direction, said circuit closing means also serving to provide braking means for retarding movement of said shaft.

3. In signaling means, a casing, a shaft rotatable therein, a signaling arm carried by said shaft at the outer end thereof, means for releasably locking said shaft against rotation, an electric light carried by said arm at one end thereof, means for rocking the shaft in either direction, and circuit closing means interposed in the circuit of said light for closing said circuit when the shaft is rocked in either direction, said circuit closing means also serving to provide braking means for retarding movement of said shaft, said braking means being adapted to present uniformly increasing retardation to the movement of said shaft when the shaft is rocked in either direction.

4. In signaling means, a casing, a shaft rotatable therein, a signaling arm carried by said shaft at the outer end thereof, means for oscillating said shaft, an electric light carried by said arm, a contact bar mounted within said casing, a contact finger carried by the shaft and connected to one pole of said lamp, said finger being normally out of contact with the bar and adapted to engage the end portion thereof when moved in either direction so as to retard rotation of the shaft.

5. In signaling means, a casing, a shaft rotatably mounted therein, a signaling arm carried by said shaft, an electric lamp carried by said arm, means for rocking the shaft in either direction, a contact bar mounted within the casing and provided with a central depression, and a resilient contact finger secured on said shaft and extending radially therefrom, the outer end portion of said finger normally extending above the depression in the contact bar and being so spaced therefrom as to engage the end portions of the bar when the shaft is oscillated in either direction.

6. In signaling means, a casing, a shaft rotatably mounted therein, a signaling arm carried by said shaft at the outer end thereof, an electric lamp carried by said arm, means for rocking the shaft in either direction, a contact bar mounted within the casing concentric with said shaft and electrically insulating therefrom, said bar being of undulating configuration and having a central depression and a raised portion at each end contiguous therewith, and a resilient contact finger secured on said shaft and extending radially therefrom, said finger being connected to one pole of the lamp and the outer portion of said finger being normally spaced a short distance above the depressed portion of said bar.

In testimony whereof I affix my signature in presence of two witnesses.

PEYTON H. WORKMAN.

Witnesses:
 CORNELIOUS M. STEELE,
 HIPOLITO P. SEPULVEDA.